United States Patent [19]
Hallsworth

[11] Patent Number: 5,855,309
[45] Date of Patent: Jan. 5, 1999

[54] TRAILER CARGO BOX

[76] Inventor: Mark E. Hallsworth, 4980 Laguna Vista Dr., Melbourne, Fla. 32934

[21] Appl. No.: 700,841

[22] Filed: Aug. 21, 1996

[51] Int. Cl.⁶ ..................................................... B60P 7/00
[52] U.S. Cl. ......................... 224/401; 224/524; 224/42.4
[58] Field of Search .................. 224/524, 534, 224/42.32, 42.4, 401; 280/769

[56] References Cited

U.S. PATENT DOCUMENTS

| | | | |
|---|---|---|---|
| D. 159,286 | 7/1950 | Morcom | D52/2 |
| D. 215,541 | 10/1969 | Smith | D14/3 |
| 1,743,220 | 1/1930 | Johnson | 224/524 X |
| 2,497,597 | 2/1950 | Gatewood | 224/401 X |
| 2,622,887 | 12/1952 | Prior | 280/5 |
| 3,036,749 | 5/1962 | Evans | 224/42.32 |
| 3,266,765 | 8/1966 | Campbell | 224/42.32 X |
| 3,583,718 | 6/1971 | Meyer | 280/5 |
| 3,658,201 | 4/1972 | Williams et al. | 224/534 X |
| 3,779,580 | 12/1973 | Thelen | 280/164 |
| 3,880,335 | 4/1975 | Winkler | 224/401 X |
| 4,006,852 | 2/1977 | Pilsner et al. | 224/42.03 |
| 4,135,596 | 1/1979 | Silba | 180/111 |
| 4,367,572 | 1/1983 | Zielenski | 224/42.4 X |
| 4,643,441 | 2/1987 | Schartz | 280/5 R |
| 5,002,325 | 3/1991 | Fought et al. | 296/37.14 |
| 5,135,258 | 8/1992 | Buxton | 280/839 |

*Primary Examiner*—Renee S. Luebke
*Attorney, Agent, or Firm*—Brian S. Steinberger; Law Offices of Brian S. Steinberger

[57] ABSTRACT

Cargo boxes for trailers that support boats, jet skis, motorcycles, off road vehicles and power equipment A first embodiment has ninety degree angled channels in rectangular shape that are bolted to the front of a boat trailer frame or rear bumper of a towing vehicle. A hinged strap fits through the handle on five gallon gas cans or ice chests. One end of the strap is welded to the channels, the second end has a slot for fitting about a loop attached to a front channel. A key/combination padlock inserts through the loop locking the storage container to the channels A second embodiment has an I-Frame formed by two angled channels separated by telescoping adjustable plates wherein the storage containers, or a hinged box can be attached thereon by bolts, and BUNGEE® cords. The components of the cargo boxes can be formed from stainless steel, aluminum, galvanized steel, molded plastic, fiberglass and the like.

13 Claims, 5 Drawing Sheets

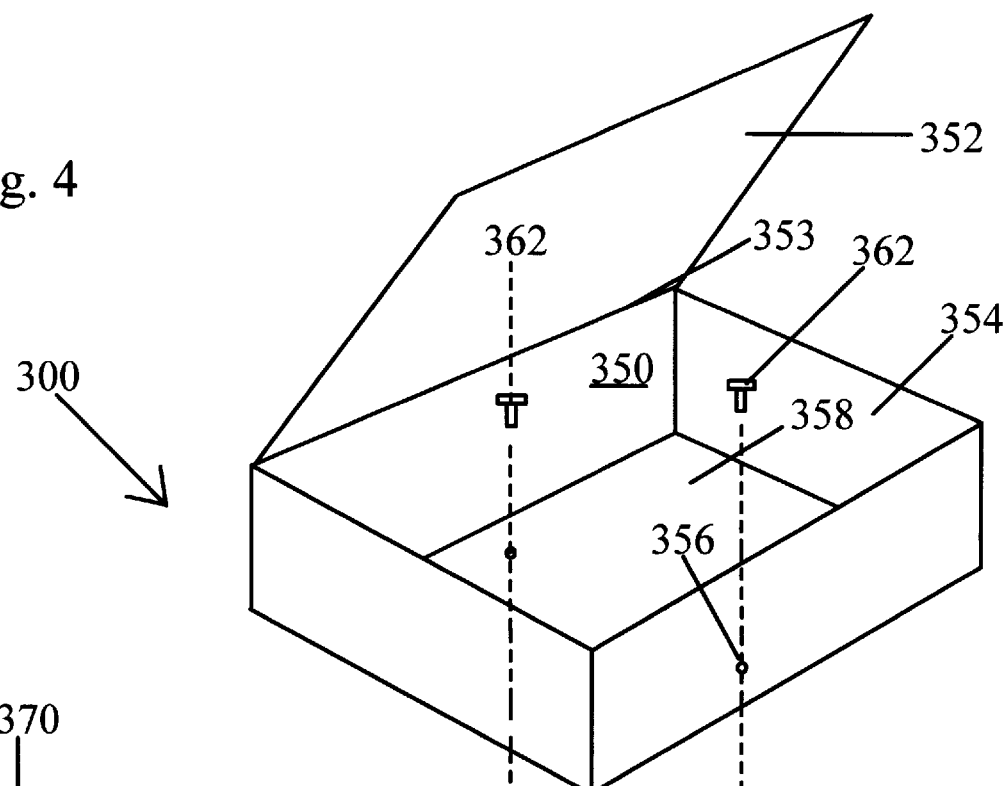
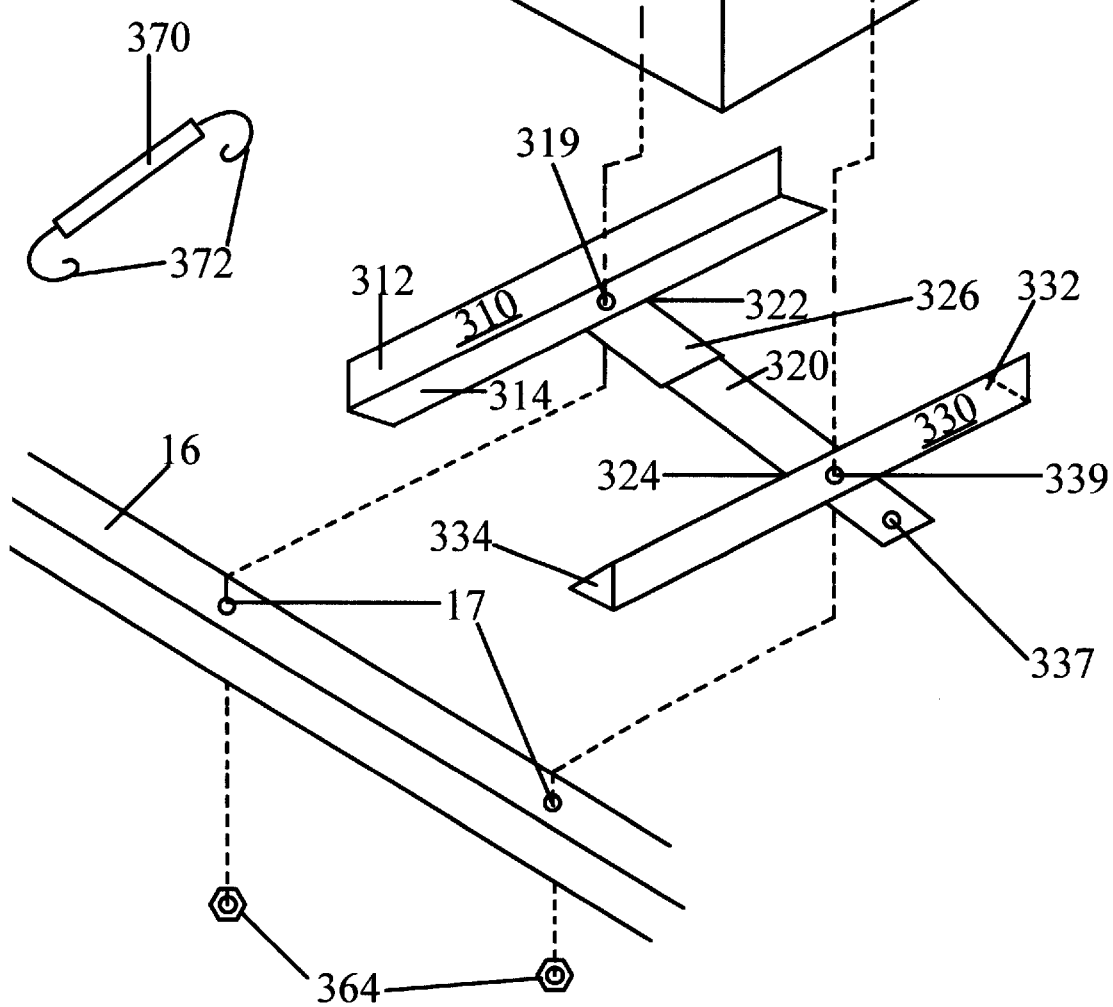

TRAILER CARGO BOX

This invention relates to a fuel container support attachment, and in particular to box attachments for boat trailers that can safely and adequately support gas cans and the like.

BACKGROUND AND PRIOR ART

Gasoline driven power boats usually need separate gasoline containers such as five gallon cans for storage of extra fuel. The traditional trailers used for transporting these boats do not allow for storing these extra gasoline containers. While transporting these boats, the gasoline cans are usually stored in the trunk or passenger compartment of the vehicle towing the trailer. Transporting gasoline cans in the towing vehicle itself has inherent problems. The gasoline vapors can effect passengers in the towing vehicle. Gas spillage can occur and the flammability is a destructive risk to the towing vehicle as well as to the passengers therein. Likewise, merely trying to strap the cans within the boat on the trailer during transport has similar problems. The gasoline cans can spill their contents into the boat. Strapping the gas cans to the trailer could be accomplished with ropes. However, such a loose, flimsy attachment does not provide a stable and safe support for the gas cans themselves.

Several U.S. Pat. Nos. are of related interest. See U.S. Pat. Nos.: DES.215,541 to Smith; DES. 159,286 to Morton; 2,622,887 to Prior; 3,583,718 to Meyer; 3,779,580 to Thelen; 4,006,852 to Pilsner et al.; 4,135,596 to Silba; 4,643,441 to Schwartz; and 5,002,325 to Fought et al. However, none of the prior art adequately addresses and overcomes the above referenced problems.

SUMMARY OF THE INVENTION

The first objective of the present invention is to provide a storage box for fuel containers where the box is attached to a front frame member of a trailer.

The second objective of the present invention is to provide dual storage boxes for fuel containers that can be attached to front trailer frame members behind the tow bar.

The third object of this invention is to provide an externally supported storage box that is attached directly to the towing bar of a trailer.

A preferred embodiment of the cargo box includes a rectangular frame for supporting a storage container, a bracket for mounting the frame to the side of a boat trailer, and a bendable strap for holding the storage container in the frame. The storage container can include a five gallon fuel container having a handle, an ice cooler chest with a handle, and/or a vehicle battery. The rectangular frame has ninety degree angled channels. The embodiment can be formed from aluminum, stainless steel and combinations thereof. The bendable strap has dual hinges and a slot at one end for fitting about a loop on the frame. A key lock or combination lock can lock the stored container within bendable strap and the frame. The mounting bracket has bolts and nuts for attaching the bracket to the trailer. The embodiment can further include a second rectangular frame for supporting a second storage container to the front of the boat trailer with similar components.

A second embodiment cargo box for towable boat trailers includes an I-frame for supporting a storage container with bolt and nut fasteners for mounting a storage container to both the frame and a tow bar of a trailer. The standard storage container can include an approximately five gallon fuel container having a handle, an ice cooler chest having a handle, and a vehicle battery. Additionally, the standard storage container can include a box with a hinged cover. The I-frame has two ninety degree angled channels separated and connected to one another by a longitudinal plate. A still another fastener can include an expandable BUNGEE® cable for attaching the storage container to the I-Frame.

Further objects and advantages of this invention will be apparent from the following detailed description of a presently preferred embodiment which is illustrated schematically in the accompanying drawings.

BRIEF DESCRIPTION OF THE FIGURES

FIG. 4 is an exploded view another storage box for attachment to the towing bar of a trailer.

FIG. 5 is a view of an alternative attachment for the invention.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
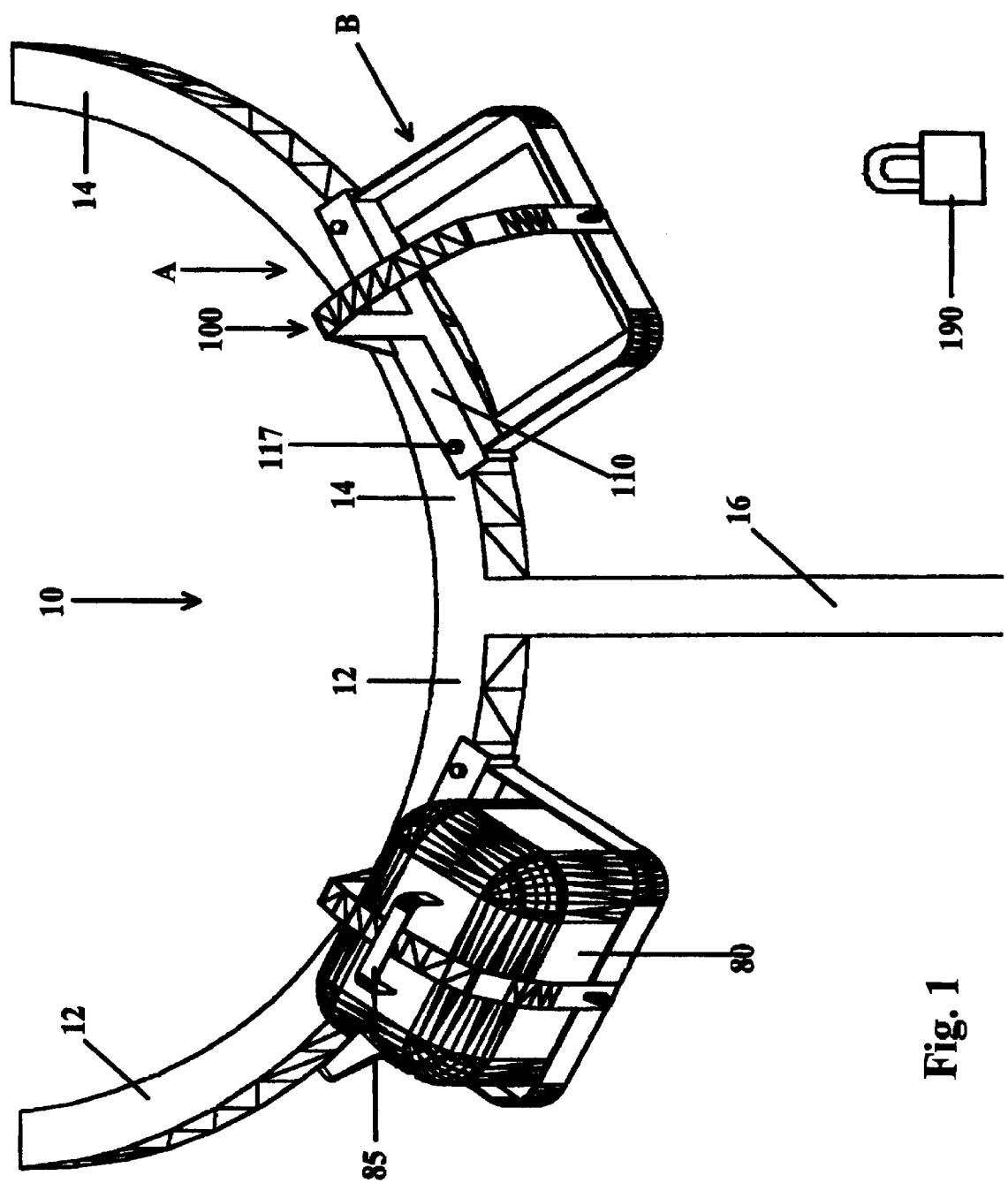
FIG. 1 is a perspective view of a preferred embodiment of the dual cargo boxes having one cargo box empty.

FIG. 1 is a perspective view of a preferred embodiment 10 of the dual cargo boxes. Referring to FIG. 1, embodiment 10 includes rounded side frame members 12 and 14 and a tow bar 16 of a trailer with cargo boxes 100 and 200 attached thereon. Five gallon gas cans 80 with respective connected handle 85 such as those manufactured by RUBBERMAID° can be supported by the cargo boxes 100 and 200.

Figure 2A:
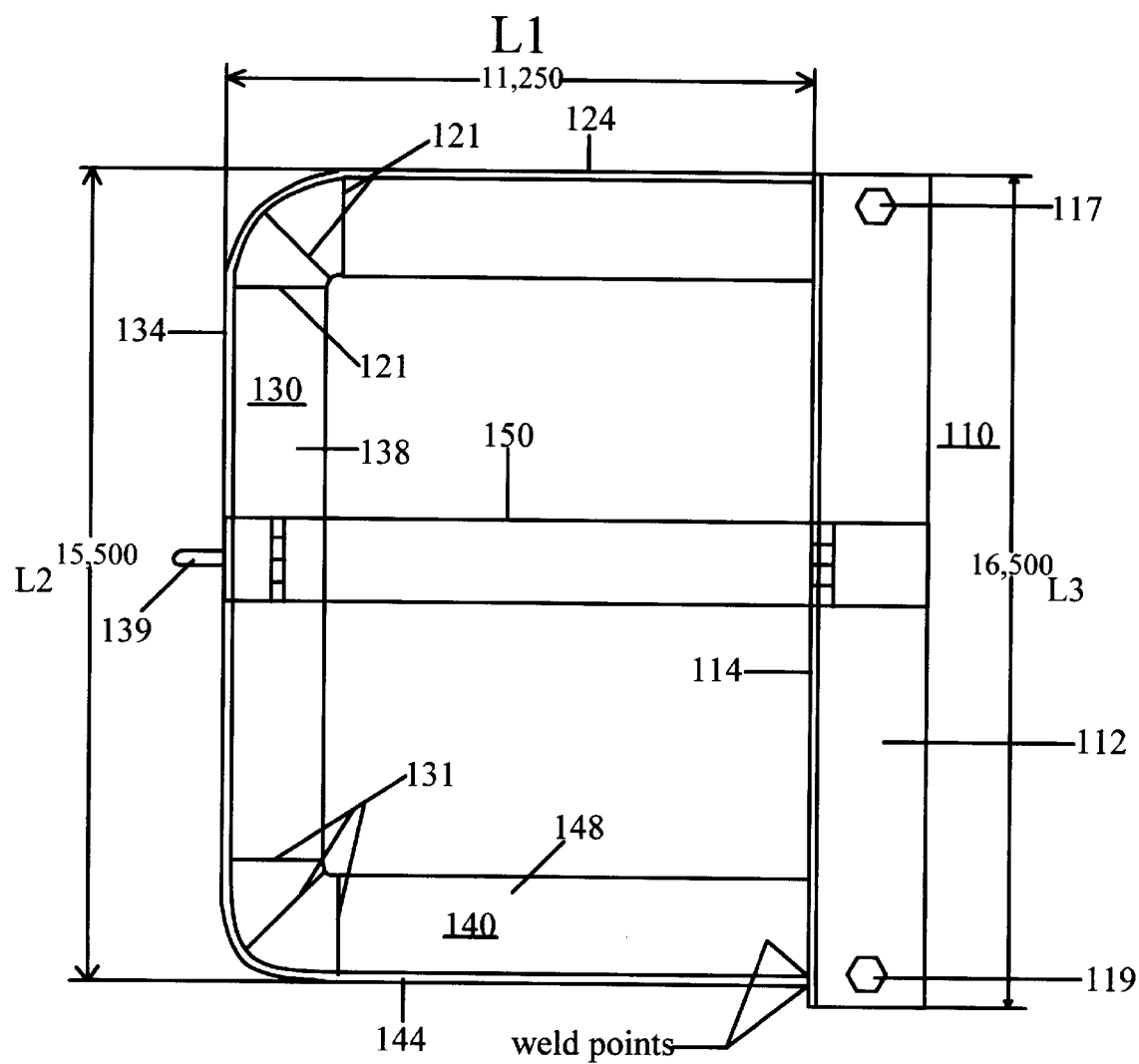
FIG. 2A is a top view of a single cargo box of FIG. 1 along arrow A.
Figure 2B:
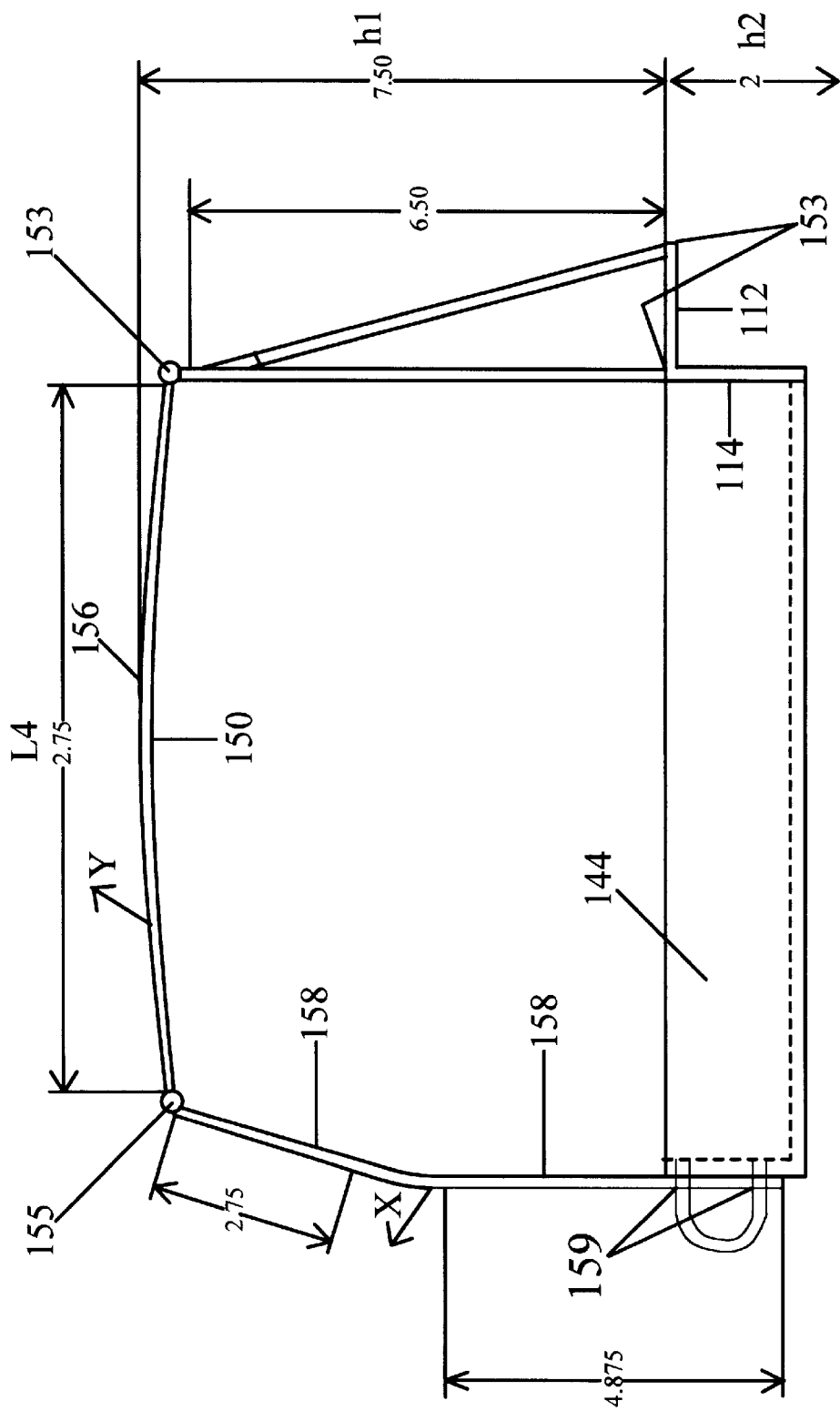
FIG. 2B is a side view of the single cargo box of FIG. 1 along arrow B.

FIG. 2A is a top view of a single cargo box 100 of FIG. 1 along arrow A. FIG. 2B is a side view of the single cargo box 100 of FIG. 1 along arrow B. Referring to FIGS. 2A–2B, single cargo box 100 includes left channel 120 having a base 128 at ninety degrees to side 124, forming a ninety degree, front channel 130 having a base 138 at ninety degrees to side 134, right channel 140 having a base 148 at ninety degrees to side 144, and a welded on rear support bracket 110 having interior side 114 and panel plate 112. A cover strap 150 is welded at points 153 by legs 152, 154 to the rear panel plate 112. A curved top strap member 156 is connected to legs 152, 154 by a first piano hinge 155. The curved top strap member 156 is connected to front curved strap 158 by a second piano hinge 155. A slot 159 through the front bottom of the curved strap 158 allows for a stainless steel lock loop 139 which is attached to the front of the front channel side 134. A key or combination padlock 190 can lock about loop 139 locking the storage container to the cargo box 100. The channels 120, 130, 140, cover strap 150 and rear support bracket 10 can be formed from aluminum, stainless steel, galvanized steel and the like. Channels 120, 130 and 140 can be formed from a single channel where plural cuts 121, and 131 can be made in their respective bases allowing the channels to be bent into a rectangular frame shape. Fasteners 117, 119 such as stainless steel bolts, galvanized bolts and the like, with lock nuts can be used to attach the rear support bracket 110 to the edge of trailer frame member 14. The other cargo box 200 is constructed in a similar manner and is attached to the edge of the other front trailer frame member 12.

The dimensions of the cargo box 100 of FIGS. 2A, 2B can have the left and right channels 120, 140 having a length, L1, of approximately 11.25 inches, front channel 130 having a length, L2, of approximately 15.5 inches, rear bracket 110 having a length, L3, of approximately 16.5 inches. Between piano hinges 153, 155, curved top strap member 156 can have a length, L4, of approximately 9.75 inches. Each of the individual channels 120, 130, 140 and rear bracket 110 can have individual dimensions of two inches by two inches by 0.125 inches thick. The overall height, h1&h2 of the top of the strap 150 to the bottom of each channel can be approximately 9.5 inches.

Figure 3:
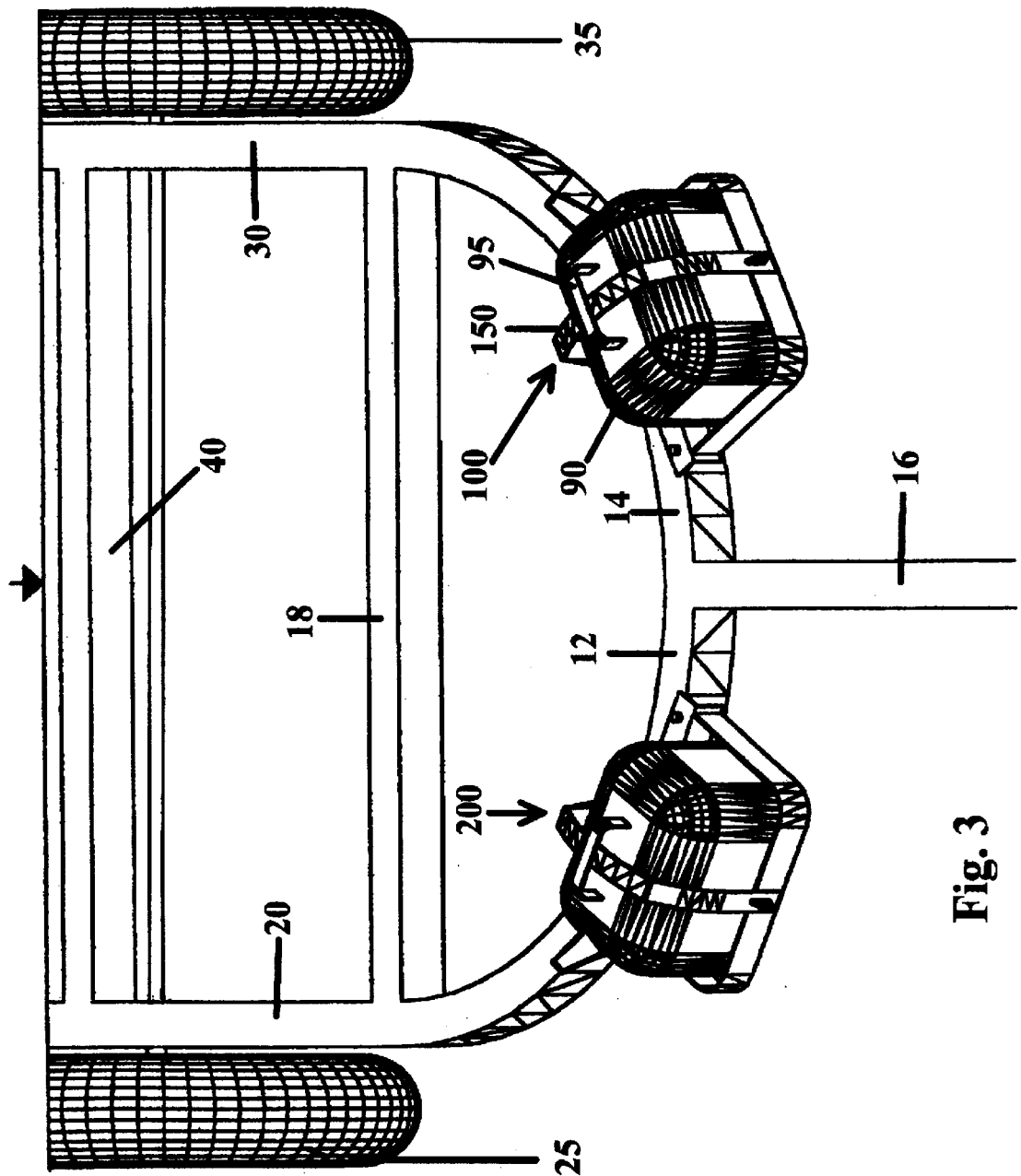
FIG. 3 is a view of the embodiment of FIG. 1 with both cargo boxes supporting gas cans.

FIG. 3 is a view of the embodiment of FIG. 1 with both cargo boxes 100, 200, supporting respective gas cans 80, 90, on the front portions 12, 14 of a trailer frame having side members 20, 30, cross-braces 18, 40 and wheels 25, 35. Referring to FIGS. 2A, 2B, and 3, strap 150 bends back along piano hinges 153, 155 in the direction of arrows X and Y in order to pass through the built-on handle 95 of a five gallon gas can 90 to be inserted between the channels 120, 130, 140 of cargo box 100.

Although, five gallon gas cans are described in the preferred embodiment of FIGS. 1, 2A, 2B, and 3, the cargo boxes 100, 200 can be used to support other storage containers such as but not limited to handled ice chests, picnic chests, such as ones manufactured by IGLOO®, RUBBERMAID®, vehicle batteries, and the like.

Although the first preferred embodiment is described as mounted to a trailer, the rear support bracket can also be mounted to a rear bumper on a towing vehicle such as a car, truck or camper's rear bumper.

FIG. 4 is an exploded view of another storage box embodiment 300 for attachment to the towing bar 16 of a trailer such as those depicted in the previous figures. An I-Frame support has two ninety-degree angled channels 310, 330 each having sides 312, 332 perpendicular to base portions 314, 334. At least one of central longitudinal telescoping plates 320, 326 can be welded at ends 322, 324, to mid-portions of the channels 310, 330, respectively. Telescoping plates 320, 326 adjust to the box 350. A storage container 350 has the shape of a rectangular box having sides 354, and lid 352 attached by a hinge 353 to one of the sides 354. The ends of bolts 362 pass through openings 356 in the floor 358 of box 350 and through mateable openings 319, 339 in the channels 310, 330 through mateable openings 17 where nuts 364 attach the embodiment to the tow bar 16. An optional through-hole 337 can be used for moving the position of channel 330. The other types of storage containers such as the gas can and ice chest previously described can be alternatively attached to the I-Frame by using a BUNGEE® cable 370 having hook ends 372 FIG. 5 for attaching to either or both the tow bar 16 FIGS. 1 and 3 and the I-Frame channels 310, 330 FIG. 4.

Although the preferred embodiments can be formed from stainless steel, galvanized steel and aluminum, the embodiments can also be formed from molded plastic, fiberglass and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A cargo box for trailers comprising in combination:

a towing trailer having base members;

a rectangular frame having beams for supporting a storage container;

a bracket for mounting one of the beams of the frame to a front side edge of one of the base members of the trailer; and a bendable strap for holding the storage container in the frame, the mounting bracket further includes:

a vertical raised leg attached between one of the rectangular frame beams and one end of the bendable strap;

a plate perpendicular to the vertical raised leg having an interior edge and an exterior edge, the interior edge attached to the one of the rectangular frame beams; and a strengthening leg attached to both the vertical raised leg and the exterior edge of the plate.

2. The cargo box for trailers of claim 1, wherein the storage container is:

a fuel container having a handle.

3. The cargo box for trailers of claim 1, wherein the fuel container further is:

an approximately five gallon fuel container.

4. The cargo box for trailers of claim 1, wherein the storage container is:

an ice cooler chest having a handle.

5. The cargo box for trailers of claim 1, wherein the storage container is:

a vehicle battery.

6. The cargo box for trailers of claim 1, wherein the rectangular frame includes:

ninety degree angled channels.

7. The cargo box for trailers of claim 1, wherein the frame and bendable strap are formed from:

aluminum.

8. The cargo box for trailers of claim 1, wherein the bendable strap includes:

a hinge at one end and a slot at an opposite end for fitting about a loop on the frame.

9. The cargo box for trailers of claim 8, wherein the bendable strap further includes:

a second hinge.

10. The cargo box for trailers of claim 1, wherein the mounting bracket includes:

bolts and nuts for attaching the bracket to the trailer.

11. The cargo box for trailers of claim 1, wherein the trailer is:

a boat trailer.

12. The cargo box for trailers of claim 1, further comprising:

a second rectangular frame for supporting a second storage container;

a second bracket for mounting the second frame to another front side edge of another one of the base members of the trailer; and a second bendable strap for holding the second storage container in the second frame.

13. A cargo box for trailers comprising in combination:

a towing trailer having base members with edges;

a rectangular frame having beams for supporting a storage container;

a strap for holding the storage container to the frame;

a bracket for mounting the frame to one of the edges of one of the base members of the trailer, the mounting bracket having a vertical raised leg attached between one of the beams and one end of the strap, a plate perpendicular to both the vertical raised leg and the one of the beams, the plate having an interior edge and an exterior edge, the interior edge attached to the one of the beams, and a strengthening leg attached to both the vertical raised leg and the exterior edge of the plate, wherein the plate of the bracket and the one of the beams of the frame abut against and overly the one of the edges of the one of the base members of the trailer; and means for securing the bracket to the trailer.

* * * * *